3,208,862
MORTAR
Ben Davies, Pittsburgh, and Donald O. McCreight, Bethel Park, Pa., assignors to Harbison-Walker Refractories Company, Pittsburgh, Pa., a corporation of Pennsylvania
No Drawing. Filed Feb. 12, 1964, Ser. No. 344,179
16 Claims. (Cl. 106—66)

This application is a continuation-in-part of copending application Serial No. 312,895, filed October 1, 1963, and having the same title and inventors, which has been abandoned in favor of this application.

This invention relates to refractory mortars. In a particular embodiment, it relates to improved chemically basic mortars, particularly suited for laying up burned, basic refractory brick and shapes of the chrome ore-magnesia type. By brick of the chrome ore-magnesia type we mean a brick in which the chrome ore content, on a weight basis, exceeds the magnesia content. As a rule, commercially available brick of this type have from 80 to 60% chrome ore and 20 to 40% magnesia in the batches from which they are made.

A good refractory mortar should have acceptable workability (so it can be trowelled), resistance to stiffening and tearing during working or trowelling, good adhesion or adherence to the shapes it is to hold in place, and should have good strength after the structure in which it is used is heated to operating temperatures. Most mortars of which we know have all or most of the foregoing properties, at least to an acceptable degree.

Another important characteristic, which good refractory mortar should have, is the ability to resist the molten metal, slag and furnace fumes it will contact when it is in service. It is most desirable that its resistance to these materials be at least as good as the brick or shapes with which the mortar is to be used. For example, in copper converters, chrome ore-magnesia brick are commonly employed as at least a part of the molten metal-contacting lining thereof and the mortar used to lay up the brick desirably is at least as good as the brick in resistance to copper converter process parameters.

Accordingly, it is an object of this invention to provide an improved refractory mortar, particularly suited for laying up burned basic shapes and particularly those of the chrome ore-magnesia type. It is another and a specific object of this invention to provide an improved mortar particularly suitable for laying up chrome ore-magnesia brick of the type used to fabricate molten metal contacting portions of copper converters.

Briefly, a mortar, according to the concepts of this invention, on the basis of dry solids, and by weight on an oxide basis, will contain at least about 40% of $Cr_2O_3$ and preferably not more than 80% $Cr_2O_3$ but this is less critical than certain other requirements. Of the total $Cr_2O_3$ by analysis, at least about 10 and, preferably, less than about 40% must be in the form of very finely divided high purity green chrome sesquioxide. The preferred mortar further includes a sodium silicate bond and a minor amount of a ball clay plasticizer; for example, about 8 parts of dry sodium silicate having a sodium oxide to silicon dioxide ratio on the order of about 1:2 to 1:3 is satisfactory.

It is preferred that the selected chrome ore have about 50%, by weight, $Cr_2O_3$, on the basis of an oxide analysis but other grades are also satisfactory. Particularly satisfactory are Turkish and Philippine chrome ores having the following exemplary chemical analyses:

|  | Turkish, percent | Philippine, percent |
| --- | --- | --- |
| Silica ($SiO_2$) | 2.5 | 2.5 |
| Alumina ($Al_2O_3$) | 14.1 | 30.5 |
| Chromic oxide ($Cr_2O_3$) | 50.0 | 33.5 |
| Iron oxide (FeO) | 13.5 | 12.9 |
| Lime (CaO) | 0.2 | 0.6 |
| Magnesia (MgO) | 18.6 | 18.9 |
| Ignition |  | 1.0 |

Generally, the ores which are useable are of the refractory or metallurgical types which grades are typified by $Cr_2O_3$ content ranging from just a little under 30% to just a little above 50%, by weight.

All chrome ores contribute MgO to the analysis of the batch. If desired, a minor amount of magnesium oxide (magnesia) can be added to the mortar; but it is not essential; and there are definite limitations on its use. It is found that the $Cr_2O_3$ to MgO ratio of the entire batch, by weight, on an oxide basis, must exceed about 3:1.

The refractory components of the optimum mortar excluding the bond forming ingredients mentioned previously should contain at least 55%, by weight, $Cr_2O_3$, on an oxide analysis. At least of this, 10% or more must be added, as high purity green chrome sesquioxide.

The chromic oxide used in our composition is the material so described in the chemical trade. It is available in grades with such descriptions as (1) technical, (2) C.P., and (3) 99%, each considered to have a purity in excess of 97%, and being fine ground. These are the materials commonly used as paint pigments, for ceramic coloring, and as a catalyst in organic synthesis. Of the material ordinarily shipped, 98% minimum will pass 325 mesh. It is material of the kind, in technical grade that we prefer to use. Scattering of particles up to the coarsest grains in our mortars (−28 mesh) would do no harm except to diminish to some degree the effectiveness of the $Cr_2O_3$ as a chemical additive. Chromic oxide is water insoluble, in contrast to chromic acid (anhydride); this is especially important for use in mortars since any substantial amount of soluble ions greatly impairs the strength derived from the bonding agents. Our work has shown clearly that mortars which derive their entire $Cr_2O_3$ content from the chrome ore do not have the slag resistance which characterize the products of our invention. In fact, it is the inadequacy of such mortars which led to the extensive studies which resulted in our invention.

A preferred mortar composition according to this invention is comprised of 30%, by weight, of the pigment grade green chromic sesquioxide, about 60% Turkish chrome ore, 9.0% of selected bonds, such as sodium silicate of the type above discussed, and including 1% of a ball clay plasticizer. If one desired, up to about 1% of a commercial grade starch-type ingredient or equivalent, such as corn-starch, can be added. Other examples are as follows:

While we prefer sodium silicate as the bond, other bonds recognized by those skilled in the refractories art can be used. For example: water soluble chromates, such as sodium chromate; water soluble sulfates, such as sodium sulfate; can be used when a minor amount of magnesia is present. Various alkaline phosphates are also recognized in the art as suitable additives with chrome ore-containing refractory materials. Also, liquid sodium silicate can be used, but this requires that the batch contain no active magnesia, not even the usual dead burned type.

The ball clay, sodium silicate, and pigment grade green chrome sesquioxide are all fine ground. The chrome ore constituent (and a minor amount of magnesia, if so desired) is all −28 mesh and the major portion of it is +150 mesh. Thus, it can be stated that the chrome ore is approximately 40% +65 mesh and 60% −65 mesh. We prefer that substantially all of the chrome ore be of greater size than 325 mesh, but up to about 20 or 30% can be −325 mesh.

An exemplary sizing for the chrome ore is as follows:

| | |
|---|---|
| 100% | −28 mesh. |
| 40–50% | On 65 mesh. |
| 60–50% | On 325 (but up to 20 to 30% can pass the 325 mesh screen). |

Sizings are according to the Tyler series of sieves or screens unless otherwise specifically stated.

In a series of tests, varying proportions of batch ingredients, identified hereafter, were dry mixed for about five minutes in a small mixer, and then for an additional five minutes in the same mixer with a water addition. The water was added in a quantity sufficient to supply about 20 parts, by weight, of water to each 100 parts of the dry mix. These proportions of water and dry ingredients are considered fairly typical of that required to bring a mortar mix of this type to a suitable working consistency. The various batches were used to join halves of identical test specimens. Each specimen was, in fact, a 4½ x 4½ x 2½" brick (one half a nominal "9 inch straight" in the refractories industry) which had been sawed in two. The two pieces were then joined together with the various ingredients mixtures. The test brick consisted of about 80 parts of chrome ore (Phillippine type) and about 20 parts of magnesia, and had been burned to a temperature of about 2900° F. The mortar joint was about ⅛" thick.

The test brick or specimens joined with the various ingredients mixtures or mortars were placed in a furnace with an upper surface inclined at an angle of about 30° relative to the horizontal (or the bottom of the furnace), and were oriented in such a way that molten slag could be dripped onto the mortar joint near the upper end and run down along the joint. About 800 grams were dripped on each specimen. We conducted such a slag test, in an electric furnace at 2500° F., with a reducing atmosphere which was maintained by placing coke on the furnace hearth which coke was replenished hourly. The slag was copper converter slag and it had approximately the following analysis, by weight, and on an oxide analysis:

| | Percent |
|---|---|
| Silica ($SiO_2$) | 27.9 |
| Alumina ($Al_2O_3$) | 5.0 |
| Iron oxide ($Fe_2O_3$) | 61.0 |
| Chromic oxide ($Cr_2O_3$) | |
| Lime (CaO) | 1.5 |
| Magnesia (MgO) | 1.0 |
| Copper oxide (CuO) | 1.5 |
| Sulfur (S) | 0.5 |
| Soda ($Na_2O$) | 1.0 |
| Potash ($K_2O$) | 1.0 |
| Lithia ($Li_2O$) | 0.5 |
| | 100.0 |

We prepared a group of ingredient mixtures having the same compositions noted below, ground to the desired mortar size grading.

Table I

| Mixes | A | B | C | D | E |
|---|---|---|---|---|---|
| | Percent | Percent | Percent | Percent | Percent |
| Chromic oxide | 40 | 30 | 20 | 10 | |
| Turkish chrome ore | 50.9 | 60.9 | 70.9 | 80.9 | |
| Philippine chrome ore | | | | | 90.9 |
| Sodium silicate | 7.5 | 7.5 | 7.5 | 7.5 | 7.5 |
| Ball clay | 1.5 | 1.5 | 1.5 | 1.5 | 1.5 |
| Starch | 0.1 | 0.1 | 0.1 | 0.1 | 0.1 |
| Analysis, dry basis: | | | | | |
| $Cr_2O_3$ | 65.4 | 60.4 | 55.4 | 50.4 | 31.4 |
| MgO | 9.5 | 11.3 | 13.2 | 15.0 | 17.2 |
| Ratio $Cr_2O_3$/MgO | 6.9 | 5.3 | 4.2 | 3.3 | 1.8 |

The resulting mortar mixtures were used to join brick in the manner just described, and subjected to a slag drip test, also just described. The results were set forth in Table II.

Table II

| | A | B | C | D | E |
|---|---|---|---|---|---|
| Dripping slag test on mortar joint at 2500° F. (800 grams of slag): | | | | | |
| Depth of corrosion at joint, inches | 0.0 | 0.05 | 0.05 | 0.40 | 0.90 |
| Corrosion rating | None | (1) | (2) | (3) | (4) |

1 Very slight.
2 Slight.
3 Considerable.
4 Severe.

The above testing established the remarkable resistance of the mortar of this invention to penetration and corrosion by copper converter slag. Mix E was included as representative of the best chrome bonding mortars previously available. The most perfunctory inspection of this test sample, with corrision almost to a depth of an inch, revealed its great contrast to Mixes A, B, and C which are indicative of mortars according to this invention, and which showed corrosion ranging from none (0.0) to only 0.05 inch. Mix D which is on the fringe of compositive showing merit, was much better than the standard Mix E, but showed considerable corrosion. For the development of the preferred properties it is obvious that as little as 10% added chromic oxide falls somewhat outside the range. It gives notable and worthwhile improvement, but we ordinarily would think it best to use 20% or more.

These tests closely relate to service experience. Ordinarily in a furnace structure the slag and corrosive metals contact only a plane surface of refractory made up of brick and thin mortar joints. When, as is often the case, the mortar is more easily corroded than the refractory brick, the joints become cut away, allowing the corrosive agents to penetrate deeply into the structure. The result is that the slag is allowed to work its way into the joints and sometimes even behind the inner course of brick so that the brick are corroded from several directions simultaneously. Early furnace failure is a common result. It is for these reasons that this invention takes on such great importance.

Still further studies were conducted to establish the relative suitability of other types of chrome ore, such as Philippine ore, to be used in mortars compounded in accordance with the invention. The analysis of this ore has been given previously. The tests established that Philippine chrome ore is substantially equivalent to the preferred Turkish chrome ore mortar component. Test mortars were made with Philippine chrome ore and 20 to 30%, by weight, of chrome sesquioxide with the same bonds as detailed in Table I, their characteristics being as shown in Table III:

Table III

|  | Mix F | Mix G |
|---|---|---|
| Mix: |  |  |
| Chromic oxide | 20 | 30 |
| Philippine ore | 70.9 | 60.9 |
| Bonds | 9.1 | 9.1 |
| Analysis, dry basis: |  |  |
| $Cr_2O_3$ | 43.8 | 50.4 |
| MgO | 13.4 | 11.5 |
| Ratio | 3.3 | 4.4 |

Joint test specimens were prepared in the same manner above discussed, and subjected to the slag drip test. The amount of slag per specimen was doubled (to 1600 grams) to increase the severity of test. After this test the amount of corrosion was negligible in amount, and comparable to Mixes C and B of Table I. It will be noted that Mix E of Table I serves as a control mix for comparison with F and G, since it also was made with Philippine ore. However, this unsatisfactory mix of the prior art contained no added chromic oxide, and its $Cr_2O_3/MgO$ ratio was only 1.8.

It is a fairly common matter to include dead burned or caustic magnesia in chrome base refractory bonding mortars. We have tested a good many mortars of the type represented by our invention, with additions of this constituent. In the main we do not consider the added magnesia as helpful. This is certainly true of resistance to slags of the type used in our tests. Still there is a certain advantage in physical properties since a magnesia addition to chrome ore refractories tends to reduce the shrinkage which occurs on heating. Therefore, so long as the added magnesia does not result in a $Cr_2O_3/MgO$ ratio below about 3.0, we consider its addition as feasible and in some cases desirable. Simple calculations will show that for a mortar mix containing 40% added chromic oxide, little more than 10% magnesia could be added without dropping below a $Cr_2O_3/MgO$ ratio of 3.0. As our test data imply, ratios lower than this may impair slag resistance.

These relationships regarding magnesia addition may be better illustrated by the mixes of Table IV. These are selected from a considerable number of mortar mixes, some of which are omitted to avoid redundancy.

Table IV

|  | H | I | J | K |
|---|---|---|---|---|
| Base mix: |  |  |  |  |
| Chromic oxide | 70 | 60 | 50 | 40 |
| Magnesia, caustic, percent | 20 | 20 | 20 | 20 |
| Turkish chrome ore | 10 | 20 | 30 | 40 |
| Chemical analysis, dry basis: |  |  |  |  |
| $Cr_2O_3$, percent | 75 | 70 | 65 | 60 |
| MgO, percent | 29.9 | 23.7 | 25.6 | 27.1 |
| $Cr_2O_3$/MgO ratio, percent | 3.4 | 2.9 | 2.5 | 2.2 |
| Dripping slag test on mortar joint at 2500° F. (800 grams of slag): |  |  |  |  |
| Depth of joint corrosion, in | 0.1 | 0.1 | 0.4 | 0.5 |
| Corrosion rating | (¹) | (²) | (³) | (⁴) |

¹ Very slight.
² Slight.
³ Moderate.
⁴ Considerable.

The mortars of Table IV used the same materials and were prepared and tested in the same way as the mixes of Table I except that the base mixes were precalcined at 3140° F. and then reground before adding the bonds to produce the mortars. This difference is believed to be without significance for our purposes. It will be noted that mixes H and I, which contained 20% added magnesia, had a satisfactory degree of slag resistance, also that this correlates with $Cr_2O_3/MgO$ ratios of 3.4 and 2.9, but that to retain these high ratios it was necessary to add 70% and 60% of chromic oxide. This brings about high costs since the chromic oxide is about three times as expensive as any of the other ingredients. It is for this reason that our preferred mixes contain no more than about 40% added chromic oxide, although higher amounts may be used.

While the mortar of this invention is especially useful with chrome ore-magnesia type basic brick, it can also be used with other basic brick of the art recognized group all magnesia or magnesite, all chrome ore, and magnesia-chrome ore.

Having thus described the invention in detail and with sufficient particularity as to enable those skilled in the art to practice it, what is desired to have protected by Letters Patent is set forth in the following claims.

We claim:

1. As a refractory mortar for joining burned basic refractory brick of the group chrome ore, magnesia, magnesia-chrome ore, and chrome ore-magnesia, a dry mixture suitable for mixing with water and consisting essentially of chrome ore and green chrome sesquioxide together with up to about 10%, by weight, of clay plasticizer and water-soluble binder, the chrome ore ingredient being of at least about 50%, by weight, $Cr_2O_3$ and constituting from 50 to 70 parts, by weight, of the mix, the green chrome sesquioxide amounting to from 10 to 30 parts, by weight, of the mixture, said clay plasticizer and water-soluble binder constituting the remainder, the total $Cr_2O_3$ to MgO ratio of the batch, by weight, on an oxide analysis, exceeding 3:1.

2. A composition of the type described in claim 1 in which the $Cr_2O_3$ content of the batch, by weight, on the basis of an oxide analysis, is from 50 to 70%, and at least about 10% of the batch $Cr_2O_3$ analysis being contributed by the green chrome sesquioxide.

3. A composition of the type described in claim 1 in which the total $Cr_2O_3$ analysis, by weight and on the basis of an oxide analysis, of the chrome ore and green chrome sesquioxide, is between 55 and 80%.

4. A composition of the type described in claim 1 in which the chrome ore is Turkish chrome ore.

5. A dry refractory batch suitable for mixing with water for use as a mortar for joining basic refractory brick, said batch consisting essentially of chrome ore, green chrome sesquioxide, and up to about 10% by weight, of clay plasticizer and water-soluble binder, the $Cr_2O_3$ and MgO contents of the batch, by weight on the basis of an oxide analysis, having a ratio exceeding about 3.0, the total $Cr_2O_3$ content of the batch being between 40 and 80%, at least about 10% of the $Cr_2O_3$ being supplied by the chrome sesquioxide.

6. The dry refractory batch of claim 5 in which the chrome ore is Turkish chrome ore.

7. The dry refractory batch of claim 5 including a minor amount of magnesia but in which the $Cr_2O_3$ to MgO oxide analysis ratio, by weight, of the total batch exceeds about 3:1.

8. The dry refractory batch of claim 5 in which all of the constituents pass a 28 mesh screen, 20 to 30% rest on a 65 mesh screen with the remainder being —65 mesh.

9. The dry refractory batch of claim 8 in which about 20 to 50% of the total dry refractory batch is —325 mesh.

10. The dry refractory batch of claim 5 in which the chrome ore and green chrome sesquioxide are added to the batch in the form of presintered grain.

11. The dry refractory batch of claim 7 in which the chrome ore, green chrome sesquioxide and magnesia are added to the batch in the form of presintered grain.

12. As a refractory mortar for joining burned basic refractory brick of the group chrome ore, magnesia, magnesia-chrome ore, and chrome ore-magnesia, a dry mixture suitable for mixing with water and consisting essentially of chrome ore and green chrome sesquioxide together with up to about 10%, by weight, of clay plasticizer and water-soluble binder, the chrome ore constituting from 40 to about 80 parts, by weight, of the mix, the green chrome sesquioxide amounting to from 10 to 40 parts, by weight, of the mix, clay plasticizer and water-soluble binder constituting the remainder, the total $Cr_2O_3$ to MgO ratio of the batch, by weight, on an oxide analysis, exceeding 3:1.

13. A composition of the type described in claim 12 in which the chrome ore is Philippine chrome ore concentrates.

14. As a dry refractory batch suitable for mixing with binders and water to form a refractory mortar for joining burned basic refractory brick of the group chrome ore, magnesia, magnesia-chrome ore, and chrome ore-magnesia, a mixture consisting essentially of chrome ore and green chrome sesquioxide, the chrome ore constituting from 40 to about 80 parts, by weight, of the mix, the green chrome sesquioxide amounting to from 10 to 40 parts, by weight, of the mix.

15. As a refractory mortar for joining burned basic refractory brick of the group chrome ore, magnesia, magnesia-chrome ore, and chrome ore-magnesia, a dry mixture suitable for mixing with water and consisting essentially of chrome ore, green chrome sesquioxide and magnesia together with up to about 10% by weight, of clay plasticizer and water-soluble binder, the chrome ore ingredients being of at least about 50%, by weight, $Cr_2O_3$ and constituting from 50 to 70 parts, by weight, of the mix, the green chrome sesquioxide amounting to from 10 to 30 parts, by weight, of the mixture, the clay plasticizer and water-soluble binder and the magnesia constituting the remainder, the total $Cr_2O_3$ to MgO ratio of the batch, by weight, on an oxide analysis, exceeding 3:1.

16. As a dry refractory batch suitable for mixing with bonds and water to form a refractory mortar for joining burned basic refractory brick of the group chrome ore, magnesia, magnesia-chrome ore, and chrome ore-magnesia, a mixture consisting essentially of chrome ore, green chrome sesquioxide and magnesia, the chrome ore constituting from 40 to about 80 parts, by weight, of the mix, the green chrome sesquioxide amounting to from 10 to 40 parts, by weight, of the mix, the total $Cr_2O_3$ to MgO ratio of the batch by weight based on an oxide analysis, exceeding 3:1.

References Cited by the Examiner
UNITED STATES PATENTS

| | | | |
|---|---|---|---|
| 1,514,812 | 11/24 | Youngman | 106—66 |
| 3,138,469 | 6/64 | Craig et al. | 106—59 |

TOBIAS E. LEVOW, *Primary Examiner.*